United States Patent [19]

Heidelberg

[11] Patent Number: 4,491,769
[45] Date of Patent: Jan. 1, 1985

[54] ROTARY ELECTRIC MACHINE

[76] Inventor: Götz Heidelberg, Am Hügel 16, D-8136 Percha, Fed. Rep. of Germany

[21] Appl. No.: 381,372

[22] Filed: May 24, 1982

[51] Int. Cl.³ .............................................. H02K 29/00
[52] U.S. Cl. .................................... 318/254; 318/138; 310/102 R; 310/152; 310/154; 310/173
[58] Field of Search ................. 318/138, 254 R, 254; 310/102 R, 152, 154, 173

[56] References Cited

U.S. PATENT DOCUMENTS

| 1,422,414 | 7/1922 | Burke | 171/252 |
|---|---|---|---|
| 1,958,753 | 5/1934 | Heintz | 171/252 |
| 3,158,750 | 11/1964 | Roes | 307/84 |
| 3,286,147 | 11/1966 | Parker et al. | 318/138 |
| 3,586,942 | 6/1971 | McMahan | 318/254 |
| 3,683,248 | 8/1972 | Kobayashi et al. | 318/138 X |
| 3,707,924 | 1/1973 | Barthalon et al. | 104/148 LM |
| 3,740,630 | 6/1973 | Jarret et al. | 318/138 |
| 3,866,104 | 2/1975 | Heine | 318/138 X |
| 3,942,083 | 3/1976 | Takahashi et al. | 318/254 A X |
| 4,012,652 | 3/1977 | Gilbert | 318/138 X |
| 4,107,587 | 8/1978 | Ban et al. | 318/439 |
| 4,131,828 | 12/1978 | Houshi | 318/138 |
| 4,182,967 | 1/1980 | Jordan | 310/74 |
| 4,223,255 | 9/1980 | Goldman et al. | 318/138 |
| 4,255,696 | 3/1981 | Field | 318/254 X |
| 4,382,214 | 5/1983 | Ban et al. | 318/254 |

FOREIGN PATENT DOCUMENTS

| 867436 | 9/1978 | Belgium . |
|---|---|---|
| 18904 | 11/1980 | European Pat. Off. . |
| 1033769 | 7/1958 | Fed. Rep. of Germany . |
| 1267333 | 5/1968 | Fed. Rep. of Germany . |
| 2245557 | 3/1973 | Fed. Rep. of Germany . |
| 2210995 | 7/1973 | Fed. Rep. of Germany . |
| 2930649 | 2/1980 | Fed. Rep. of Germany . |
| 2012981 | 3/1970 | France . |
| 2099961 | 3/1972 | France . |
| 2267650 | 11/1975 | France . |
| 2268377 | 11/1975 | France . |
| 526221 | 9/1972 | Switzerland . |
| 2005926 | 4/1979 | United Kingdom . |

Primary Examiner—J. V. Truhe
Assistant Examiner—Paul Shik Luen, Jr.
Attorney, Agent, or Firm—Spencer & Frank

[57] ABSTRACT

A rotary electric machine (motor or generator) comprises a first functional member and a second functional member rotatable with respect to the first one. One of the two functional members comprises a plurality of permanent magnet poles distributed in a ring arrangement, while the other one comprises a plurality of switchable electromagnet poles disposed in a ring arrangement opposite the permanent magnet poles, with an air gap in between. The numbers of permanent magnet poles and electromagnet poles either may be exactly or almost the same. At least one electronic circuit means controlled by at least one sensor detecting the rotational relative positions of the two functional members is provided for switching the electromagnet poles in the respective suitable direction of current flow and for the period of time of functional suitable relative positions with respect to the permanent magnet poles.

16 Claims, 3 Drawing Figures

ROTARY ELECTRIC MACHINE

BACKGROUND OF THE INVENTION

The instant invention relates to a rotary electric machine, in particular an electric motor or electric generator.

So far in most cases electric direct current motors which are most closely related to the electric machine according to the invention under aspects of their functioning have a structure in which the rotor rotating in a stationary stator is provided with annularly distributed windings. Also the stator includes a plurality of windings, the so-called exciter windings, which likewise are distributed in a ring arrangement. The rotor is fed with current by way of sliding contacts and a commutator disposed on the rotor shaft, the commutator taking care that the rotor windings each are switched on for a period during which they are suitably positioned opposite exciter poles. The commutator also provides for the respective proper direction of current in the rotor winding sections, taking care that only those rotor winding sections each are switched on which are located in proper relative positions with respect to exciter poles. A disadvantage of these conventional electric motors is seen above all in the mechanical switching of the rotor winding sections by means of the commutator which is susceptible to wear.

SUMMARY OF THE INVENTION

The invention, on the other hand, provides an electric machine which requires neither sliding contacts nor a commutator since the respective suitable functional switching of the electromagnet poles is effected electronically.

The subject matter of the instant invention is a rotary electric machine characterized by the combination of the following features:

(a) a first functional member and a second functional member are provided, one of which is rotatable with respect to the other, an air gap existing between the two functional members;

(b) one of the two functional members comprises a plurality of permanent magnet poles of alternating polarity distributed in a ring arrangement at the side facing the air gap;

(c) the other one of the two functional members comprises a plurality of switchable electromagnet poles distributed in a ring arrangement at the side facing the air gap;

(d) the number of permanent magnet poles corresponds exactly or approximately to the number of electromagnet poles;

(e) at least one electronic circuit means is provided for switching the electromagnet poles in the respective proper direction of current during the period of a suitable functinal relative position with respect to a permanent magnet pole;

(f) the electronic circuit means is controlled by at least one sensor disposed at the functional member which is provided with the electromagnet poles and detecting the rotational relative positions of the two functional members.

In principle, it makes no difference whether the functional member provided with the permanent magnet poles is stationary and the functional member provided with the electromagnet poles is rotatable, or vice versa. Furthermore, fundamentally it makes no difference whether the two functional members are disposed opposite each other in an axial direction or in a radial direction which would mean that one functional member is arranged within the other functional member. In the latter case of the two functional members being disposed radially inside each other, in principle, it makes no difference either whether the permanent magnet poles are disposed at the radially inner functional member and the electromagnet poles at the radially outer functional member, or vice versa. A particularly preferred embodiment, however, is one with which the rotary member of the machine is positioned radially outside and around the stationary member of the machine and with which the permanent magnet poles are arranged at the inner circumference of this rotatable machine part. The specific advantages of this embodiment will be explained in greater detail below.

The machine according to the invention may be so designed that the number of permanent magnet poles corresponds exactly to the number of electromagnet poles. Yet a small difference between the number of permanent magnet poles and the number of electromagnet poles is preferred, particularly a difference of less than 10% of the number of permanent magnet poles. It is especially advantageous to provide a few less electromagnetic poles than permanent magnet poles, e.g. 1,2,3, or 4 less. This will provide safe starting of the motor, uniform running of the motor, and even loading of the mains.

At one of its functional members, frequently referred to as the exciter member, the electric machine according to the invention comprises permanent magnets instead of (exciter) electromagnets as was customary until now. This is favorable from the point of view of the efficiency as permanent magnets do not consume current. Besides, the machine according to the invention permits substantial and surprising saving of space as well as essential and unexpected increases of the torque to be produced or of the power to be generated per unit volume, as will be explained in greater detail below.

Preferably, permanent magnets are used which have a coefficient of permeability in the order of the permeability of air ($\mu = 1$). In conventional electric motors the electromagnetic fields of the rotor have a weakening reactive effect on the exciter part of the motor. The magnitude of this reactive effect depends on the magnetic resistance in the individual magnetic circuits between the rotor and the exciter part. So far this resistance was small because of the small width of the air gap of usually about 1 mm, aimed at for different reasons. In the electric machine according to the invention, however, the individual magnetic circuits have a high magnetic resistance even if the air gap is narrow, because with the preferred choice of materials the coefficient of permeability of the permanent magnets is lower by some orders as compared to iron. Consequently, the weakening reactive effect of the electromagnetic fields on the exciter part described above is reduced quite considerably. Moreover, the inductivity of the electromagnets which are to be reversed is reduced drastically so that high reversing or switching speeds may be employed with the elecromagnet poles. This results in the advantageous possibility of furnishing the electric machine according to the invention with a great number of poles and/or operating it at high circumferential speed at the active surface or face of the air gap of the machine.

Especially preferred are permanent magnets made of a material based on rare earths and cobalt, particularly samarium cobalt permanent magnets.

In principle the electric machine according to the invention could do with but one electronic switching circuit means and a single sensor, for instance, if the number of permanent magnet poles corresponds to the number of electromagnet poles. Preferably, however, a plurality of electronic circuit means are provided for switching, each being coupled with at least one sensor. In this manner each electronic circuit means is adapted to effect the common switching of a smaller number only of electromagnet poles located at least essentially in the same relative positions with respect to the permanent magnet poles. Each electronic circuit means thus has to switch smaller powers only. For this reason the switching means used may be overproportionally cheap, and the expenditure for cooling of the switching means may be reduced while, at the same time, considerably improving the reliability of the machine since failure of individual switching means will cause no serious impairment of the overall function. Also the maintenance of the machine is rendered easier as it is possible to replace individual inexpensive switching means. The lower borderline case may be realized as well in which there is one electronic circuit means for switching each electromagnetic pole.

The particularly preferred sensors are Hall sensors or Hall detectors as they are of robust nature and adapted to be arranged readily so as to respond to the magnetic fields of the permanent magnets. Yet other sensors may be used as well, such as read contacts, photocells, induction sensors, or permeability sensors.

The novel structure of the machine according to the invention permits the provision of electromagnet poles in the form of individual structural elements which were provided individually with a winding prior to assembly and which are fixed individually to the respective functional member. These structural elements may be identical, a fact which permits cheaper production and facilitates the exchange.

Preferably, the electromagnets are arranged with their feet in contiguous relation. In that case a magnetic backing of lamellar iron may be dispensed with to produce a path of magnetic flux behind adjacent electromagnets since the mutually abutting electromagnet feet establish the required magnetic flux.

The permanent magnets preferably are arranged in circumferential direction to abut directly against one another or through the intermission of thin plastic layers. In this way the optimum permanent magnetic volume can be housed in the space available. Usually a magnetically conductive backing is provided behind the permanent magnets.

The pitch of the arrangement of the permanent magnet poles and/or the length of the permanent magnet poles in the rotational circumferential direction essentially corresponds to the length of the electromagnet poles in the rotational circumferential direction. This permits optimum utilization of the volume and, at the same time, reduces those angular ranges of rotation which do not contribute to the flux switching.

It is preferred in particular to use the electric machine according to the invention as a so-called wheel motor in motor vehicles. In that event the permanent magnets are fixed to the inner periphery of a cup-shaped member housed in a conventional motor vehicle wheel which carries a tire on the outside. The electromagnets are attached to the outer periphery of a stationary additional structural element such an air gap is formed between their outer pole faces and the inner pole faces of the permanent magnets.

BRIEF DESCRIPTION OF THE DRAWINGS

The invention will be described further, by way of example, with reference to the accompanying drawings, in which.

DETAILED DESCRIPTION OF THE PREFERRED EMBODIMENTS

Figure 1:
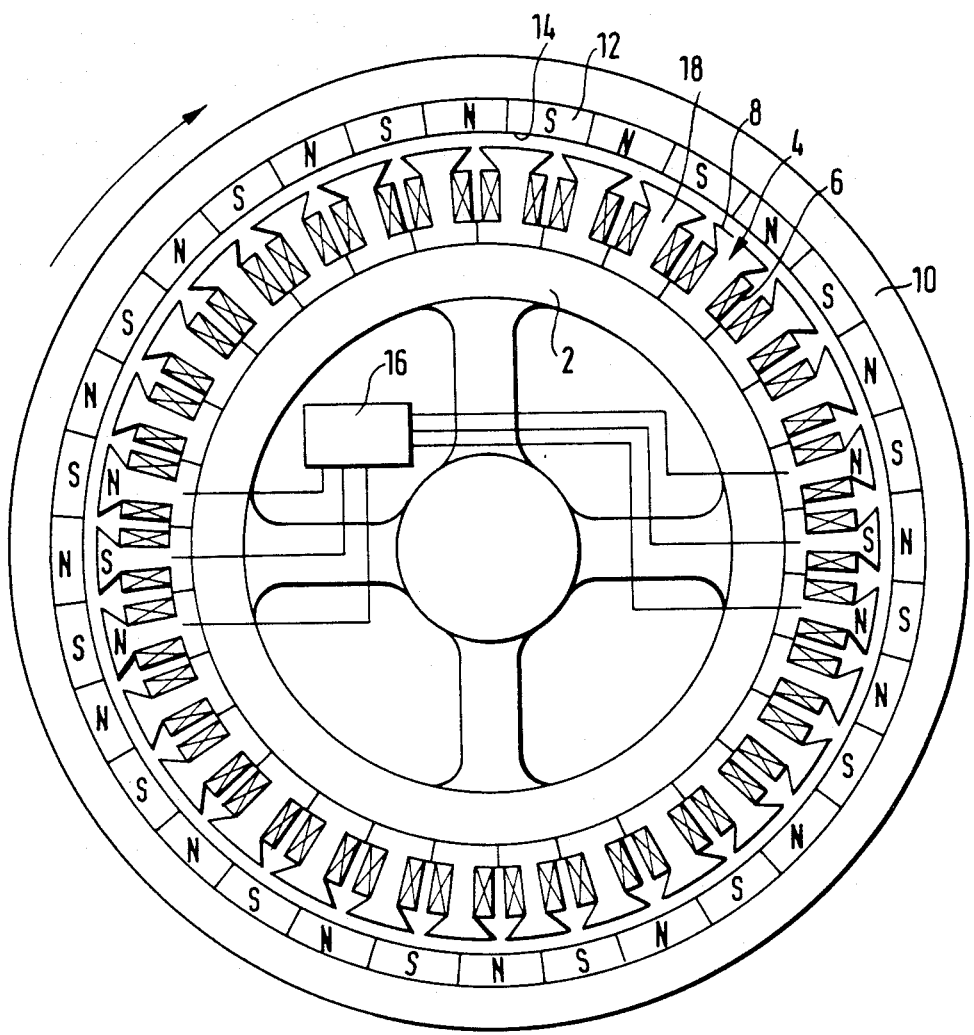
FIG. 1 is a cross sectional elevation of an electric motor, perpendicular to its axis of rotation.

The embodiment shown in FIG. 1 comprises thirty electromagnets 4 distributed at uniform pitch along the outer periphery of a stationary functional member 2. In the cross sectional elevation shown, the electromagnets 4 each have a substantially double T shaped core 18 and a winding 6, which is diagrammatically shown in the central part of the core, and has its wires extending perpendicular with respect to the plane of the drawing. At its outer circumference each electromagnet 4 has an electromagnet pole 8 which is a north pole or south pole, in response to the direction of current flow through the winding 6.

The stationary functional member 2 is surrounded by a rotatable functional member 10, on the whole substantially having the shape of a hollow cylinder closed in cup-like fashion at one end and being secured on a shaft (not shown), with its closed end axially adjacent the stationary functional member 2. Permanent 12 magnets, the embodiment shown having thirtyl-two such permanent magnets 12, are arranged at uniform pitch distributed in a ring arrangement at the inner periphery of the rotatable functional member 10. At their inner circumference the permanent magnets 12 have permanent magnet poles 14, arranged to be alternating noth and south poles in the circumferential direction. In circumferential direction, the permanent magnets 12 or the permanent magnet poles 14 each are substantially as long as the electromagnet poles 8. The individual permanent magnets 12 are directly contiguous in the circumferential direction and, for instance, may be attached by cementing.

For better understanding, the specification first will refer to the case of having the same number of electromagnet poles 8 and permanent magnet poles 14. In that event all the eletromagnets 4 would have to be reversed simultaneously whenever the relative positions of the two functional members 2, 10 are such that each permanent magnet pole 14 is positioned directly opposite an electromagnet pole 8.

The embodiment shown comprises two more permanent magnet poles 14 than electromagnet poles 8. Not all the electromagnets 4 are switched over or reversed simultaneously. Instead, five electronic circuit means (cf. description below of FIG. 3) serve for simultaneous switching of six electromagnets 4, namely two groups of three electromagnets each of which are located diametrically opposite each other. The two groups of three electromagnets 4 each are in exactly the same relative positions with respect to the permanent magnet poles 14, whereas within each group of three electromagnets the relative positions with respect to the permanent magnet poles 14 differs slightly from electromagnet pole 8 to electromagnet pole 8. An electronic circuit means 16 provided for switching the six electromagnets 4 described is shown diagrammatically. Four more such electronic circuit means 16 are provided analogously to switch the remaining electromagnets 4.

A sensor S each, embodied by a Hall detector, is provided at the leading and trailing edges in the circumferential direction of the central electromagnet pole 8 of each group of three electromagnets. These sensors serve to detect the change from the permanent magnet north pole to the permanent magnet south pole and vice versa as they rotate past the sensors. This information on the respective relative positions of the stationary functional member 2 and the rotatable functional member 10 is applied to the corresponding electronic circuit means 16. The following equation is applicable:

$$n_s \cdot n_y = n_E/(n_M - n_E)$$

$n_s = 5$—number of electronic circuit means 16
$n_y = 3$—number of adjacent, simultaneously switched electromagnet poles
$n_E = 30$—number of electromagnet poles
$n_M = 32$—number of permanent magnet poles.

At any point in time considered, all the electromagnet poles 8 are switched on and the switching is such that the current direction fits the respective cooperating permanent magnet pole 14. The electronic circuit means 16 effect switch-over of the individual electromagnet poles 8 into the other direction of current at the correct point in time.

It should be noted that embodiments of the electric machine according to the invention are conceivable with which the number of permanent magnet poles and electromagnet poles selected, as well as the dimensions of the permanent magnet poles and electromagnet poles chosen, are such that the switching of the electromagnet poles is not an act of switching practically without interruption in the current supply but rather switch-one for a certain period of time, switch-off for a certain period of time, renewed switch-on at reversed direction of current, etc.

Figure 2:
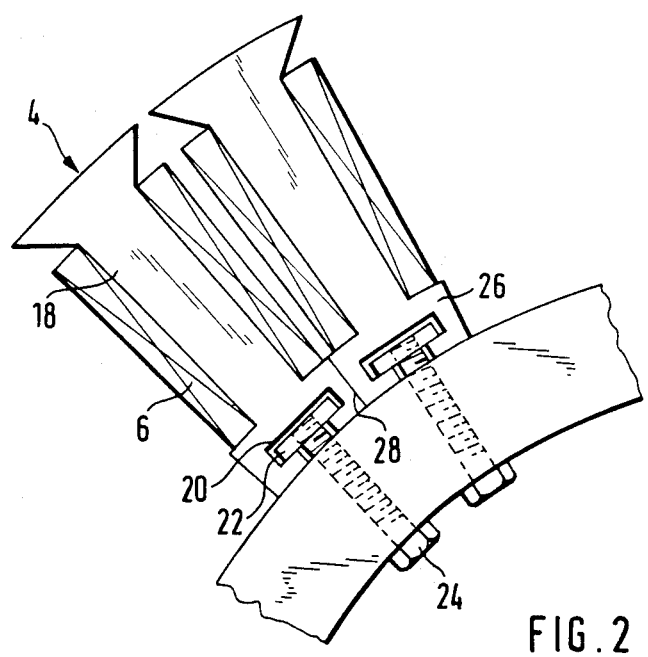
FIG. 2 shows a detail of the structure and arrangement of two adjacent electromagnets.

FIG. 2 shows on an enlarged scale how the individual electromagnets 4 are arranged and attached at the stationary functional member 2. In the cross sectional elevation shown, each electromagnet 4 has a double T shaped core 18. The core 18 may be designed as a pack of iron lamellae stacked vertically with respect to the plane of the drawing. Another form of realization provides for the core to be made up of iron powder particles embedded as densely as possible in plastic material. In this event the core 18 can be manufactured with great ease by injection molding. This process of making and designing the structure of cores 18 of electromagnets 4 is regarded as being independently inventive.

At its radial inner side each core 18 comprises an undercut groove 20 extending in the axial direction. A ledge 22 provided with threaded bores and inserted in the groove 20 and corresponding screws 24 serve to fasten each core 18 from inside to the stationary functional member 2. The technique described of producing the cores 18 and the simple fastening of the same to the stationary functional member 2 are rendered possible especially because the stationary functional member 2 does not rotate so that the electromagnets 4 are not subjected to any centrifugal forces.

Adjacent electromagnets 4 are arranged to be in surface area contact in the circumferential direction at their feet 26, in other words the radially inner leg of the double T profile. The foot contact areas 28 warrant a path of magnetic flux between adjacent electromagnets 4 so that not magnetically conductive backing need be provided at the stationary functional member 2 radially inside the electromagnets 4.

The cores 18 of the electromagnets may also be formed without the radially inner legs and fastened at the stationary functional member 2 by means of screws. In that event, however, a lamellated back or one containing iron powder particles embedded in plastics must be provided radially inside the individual electromagnets 4.

Figure 3:
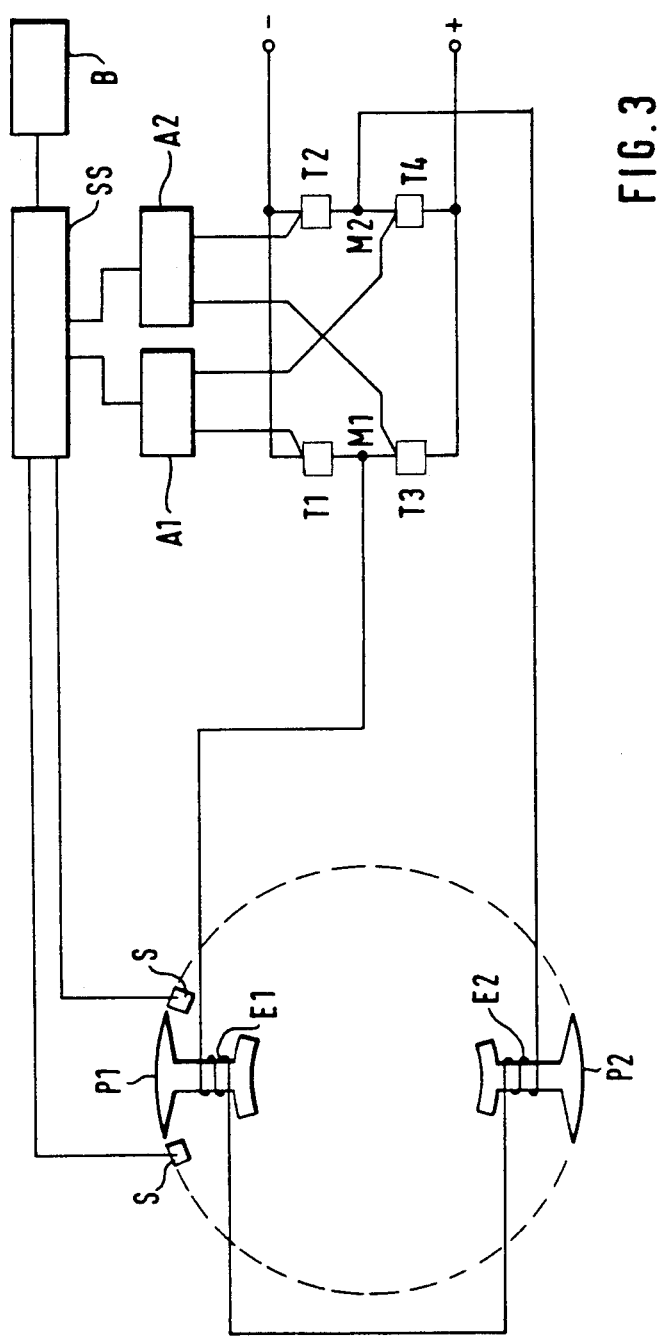
FIG. 3 shows the fundamental structure of an electronic circuit means for switching the electromagnet poles.

FIG. 3 is a more detailed view of an electronic circuit means. Of the electric machine only the stationary functional member 2 is shown together with two diametrically opposed electromagnets 4, namely the central electromagnets 4 of each of the respective group of three electromagnets described. The windings marked E1 and E2 are connected in series. Yet they could also be connected in parallel.

The series connection including the exciter windings E1 and E2 is connected to the two midpoints M1 and M2 of a circuit bridge which, as shown in this embodiment, comprises four controllable semiconductor circuit, i.e., switch elements T1,T2,T3, and T4. One end of the circuit bridge is connected to the negative pole and the other end to the positive pole of an operating voltage source. The control electrodes of the semiconductor switch elements T1,T4 disposed diagonally opposite each other in the bridge circuit are connected to the output of a first control circuit A1, while the control electrodes of the remaining semiconductor switch elements T2,T3 are connected to the output of a second control circuit A2. Control terminals at the input ends of the control circuits A1 and A2 are connected to separate outputs of a control circuit SS.

At least one sensor S is associated with one of the two functionally related electromagnet poles P1 and P2. This sensor detects the rotational relative positions of this electromagnet pole and the permanent magnet pole of the rotating functional member. In the embodiment shown it is assumed that the permanent magnet poles are provided at a ring revolving around the outside of the electromagnet poles P1 and P2. When the sensor detects a switch-over of the permanent magnet pole, the windings E1 and E2 are reversed. To this end an output signal of the sensor S is applied to the control circuit SS which will then act through the two control circuits A1 and A2 to switch on two diagonally opposed semiconductor circuit elements of the circuit bridge such that current will flow in one or the other direction through the exciter windings E1 and E2 which are connected in series.

In the embodiment shown, two sensors S are provided at both sides of the electromagnet pole P1, one sensor causing the reversal of the exciter current in the windings E1 and E2 when the electric machine rotates in one direction, and the other sensor causing said reversal when the machine rotates in the other direction.

The control circuit SS further is connected to a command transmission circuit B which may be used for the input of control commands such as start/stop, number of revolutions, direction of rotation. The control circuit SS preferably is a microprocessor applying its control signals through the control circuits A1 and A2 to the circuit bridge T1 to T4, either according to a fixed program or to a variable program in response to the command signals by the command transmission circuit and the output signals of the sensors S.

Electric machines built according to the principles of the instant invention provide a great number of significant advantages in practice: The electronic switching of the individual electromagnets does away with the sliding contacts and commutator which wear rapidly and are expensive to manufacture. The electronic control affords possibilities of control obtainable at great expense only with conventional electric machines, e.g. a great useful range of speeds, a high degree of efficiency, control to a certain torque, change of the number of revolutions, and the like. The electronic control permits a design characterized by a difference in the numbers of permanent magnet poles and electromagnet poles a circumstance which leads to safe starting of the motor, uniform running of the motor, and even loading of the mains. The permanent magnets are convenient to service and thrifty in energy consumption. If permanent magnets are used whose coefficient of permeability is related to that of air, the reduced reactive effect of the electromagnetic fields on the exciter part of the machine permits operation at much higher current intensity in the electromagnets and at a much higher speed of reversal of the electromagnets. The one-phase principle may be observed in the winding of the electromagnetic functional member, i.e. the windings of the individual electromagnets are not connected by so-called winding heads taking up a lot of space. This affords the possibility of prefabricating the electromagnets outside of the machine as identical structural elements, with all the advantages of replacement and maintenance this entails. If required, the electronic control may be so designed that each electronic circuit means switches only one or more electromagnets which at least are substantially in analagous relative positions with respect to the permanent magnet poles. Consequently, electronic circuit means my be selected which are characterized by the particular desired switching power, especially a low switching power in respect of the price, the cooling, and the maintenance. The provision of the electromagnets radially outside at an inner stationary functional member and the provision of the permanent magnets radially inside at an outer rotatable functional member facilitates the fixing of the magnets as a whole since the electromagnets are not subjected to any centrifugal force and since the permanent magnets are pressed against their fixing face by the centrifugal force. It is an additional essential aspect that the provision of the permanent magnets radially outside of the air gap displaces the so-called active surface of the machine according to the invention, i.e. the area of the radially opposed electromagnet poles and permanent magnet poles radially further to the outside because in radial direction the permanent magnets require less space than the electromagnets. This radially outwardly displaced active surface of the machine in turn offers more space for the arrangement of the electromagnets. As a consequence of the greater spacing of the active surface from the axis of rotation of the machine, the area of the active surface is enlarged and the lever arm of the magnetic forces with respect to the axis of rotation of the machine is increased. Expressed in simplified terms, these conditions permit an increase of the torque approximately by the factor 3 in comparison with conventional electric machines, at a given structural volume. In addition, the reduced reactive effect of the electromagnetic fields on the exciter part of the machine provides a further increase of the torque approximately by the factor 2 and there is also a further increase of the performance approximately by the factor 2, based on the weight because the space inside the electromagnets is almost empty. When taken together, all this provides an improvement approximately by the factor 12 and, therefore, may be said to be a technical breakthrough in the field of electric machines.

What we claim is:

1. A rotary electric machine characterized by the combination of the following features:
    (a) a first functional member and a second functional member are provided, one of which is rotatable with respect to the other, an air gap existing between the two surfaces facing each other of the two functional members;
    (b) one of the two functional members comprises a plurality of permanent magnet poles of alternating polarity distributed in a ring arrangement at the side facing the air gap;
    (c) the permanent magnet poles are provided by permanent magnets having a coefficient of permeability in the order of the permeability of air ($\mu=1$);
    (d) the other one of the two functional members comprises a plurality of switchable electromagnet poles distributed in a ring arrangement at the side facing the air gap;
    (e) the number of permanent magnet poles and the number of electromagnet poles differ by a small integer;
    (f) a plurality of electronic circuit means, each having four controllable semiconductor switch elements and each being connected to at least a respective one of said electromagnet poles, is provided for switching the electromagnet poles in the respective proper direction of current during the period of a suitable relative functional position with respect to a permanent magnet pole;
    (g) each of the electronic circuit means is controlled by at least one sensor disposed at the functional member which is provided with the electromagnet poles and detecting the rotational relative positions of the two functional members.

2. The machine as claimed in claim 1, characterized in that one of the two functional members is disposed inside the other functional member such as to establish an essentially cylindrical air gap.

3. The machine as claimed in claim 2, characterized in that the permanent magnet poles are arranged at the outer functional member.

4. The machine as claimed in claim 2 or 3, characterized in that the inner functional member is stationary, and in that the outer, rotatable functional member is of cup shape.

5. The machine as claimed in claim 1, characterized in that the permanent magnets are made of a material based on rare earths and cobalt.

6. The machine as claimed in claim 1, characterized in that each of said plurality of electronic circuit means is coupled, for common switching, to each of a partial number of electromagnet poles located in at least essentially the same relative positions with respect to permanent magnet poles.

7. The machine as claimed in claim 1, characterized in that Hall detectors are provided as sensors.

8. The machine as claimed in claim 1, characterized in that the electromagnet poles are embodied by structural elements which were individually provided with a winding and secured to the respective functional member prior to the assembly.

9. The machine as claimed in claim 8, characterized in that the structural elements are identical.

10. The machine as claimed in claim 9, characterized in that the electromagnets are arranged in the circumferential direction with their feet in contiguous relation.

11. The machine as claimed in claim 1, characterized in that the permanent magnets are arranged in circumferential direction to abut directly against one another or through the intermission of thin plastic layers.

12. The machine as claimed in claim 1, characterized in that the pitch of the arrangement of the permanent magnet poles and/or the length of the permanent magnet poles in the circumferential direction of rotation essentially corresponds to the length of the electromagnet poles in the circumferential direction of rotation.

13. The machine as defined in claim 1 or 6 wherein a large number of permanent magnet poles and a large number of electromagnet poles are provided.

14. The machine as defined in claim 13 wherein said large number of electromagnet poles is approximately 30.

15. The machine as defined in claim 1 wherein the number of said permanent magnetic poles is larger than the number of said electromagnet poles.

16. The machine as defined in claim 1 or 6 wherein said four controllable semiconductor switch elements of each of said electronic circuit means are connected in a respective bridge circuit.

* * * * *